June 28, 1960 F. J. DITTER ET AL 2,942,674
CUT-OFF ATTACHMENT FOR SOD CUTTING MACHINES
Filed May 8, 1957 5 Sheets-Sheet 1
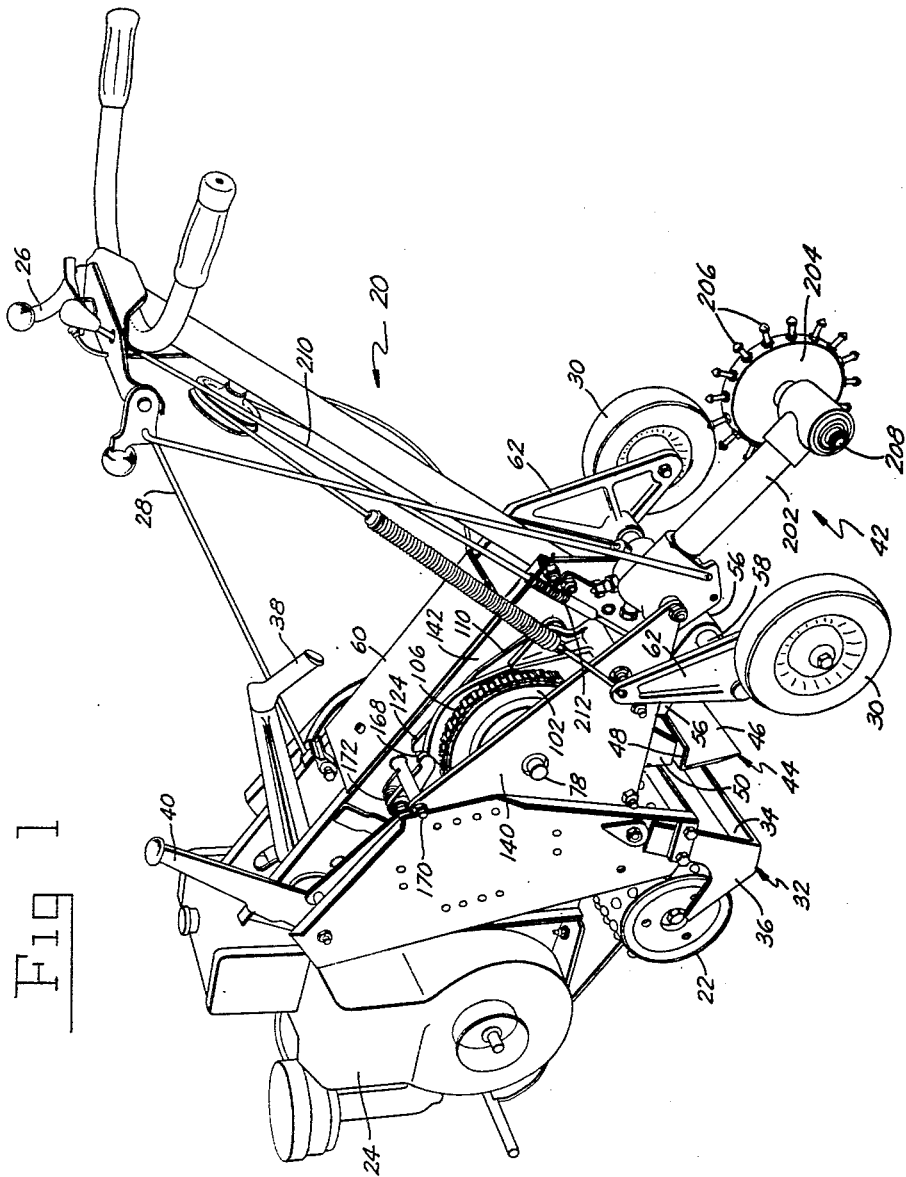
INVENTOR.
FRANCIS J. DITTER
WILLIAM C. KAERCHER JR
BY
Stuart R. Peterson
ATTORNEY June 28, 1960
F. J. DITTER ET AL
2,942,674
CUT-OFF ATTACHMENT FOR SOD CUTTING MACHINES
Filed May 8, 1957
5 Sheets-Sheet 2
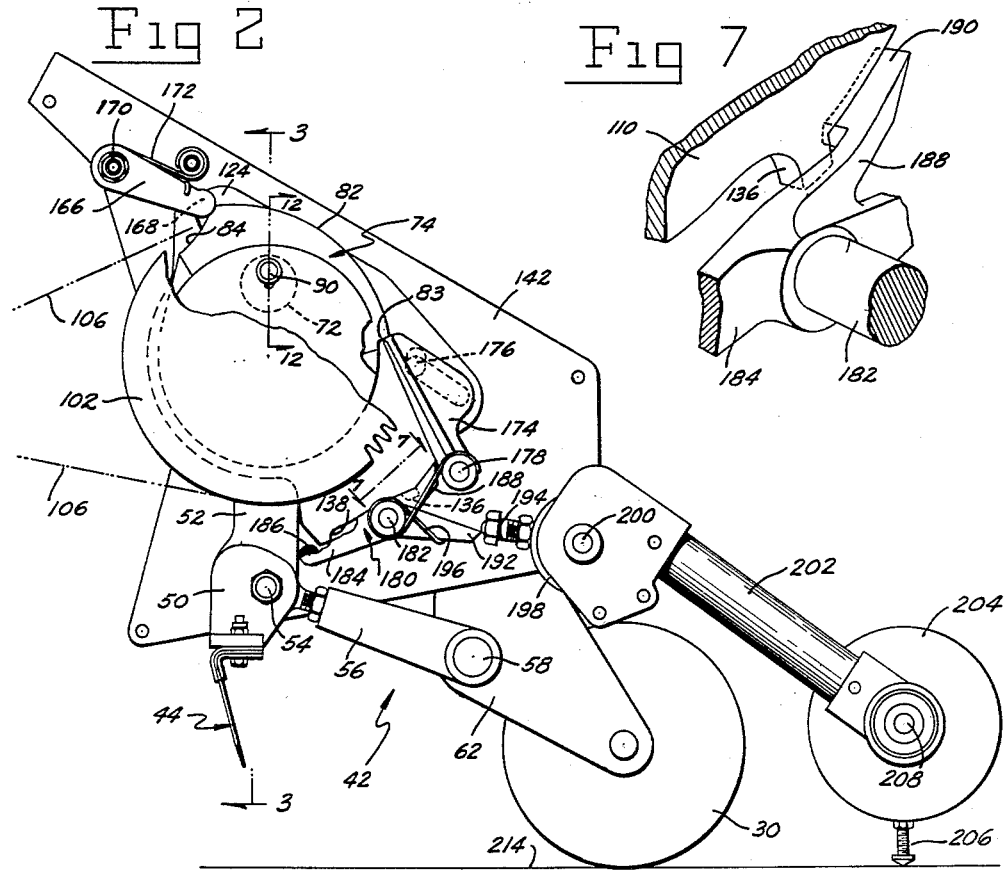
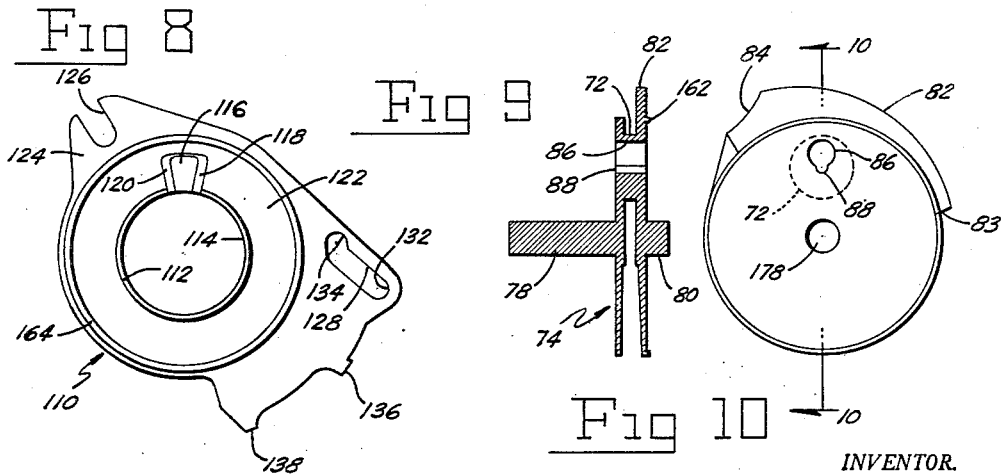
INVENTOR.
FRANCIS J. DITTER
WILLIAM C. KAERCHER JR.
BY
Stuart R. Peterson
ATTORNEY

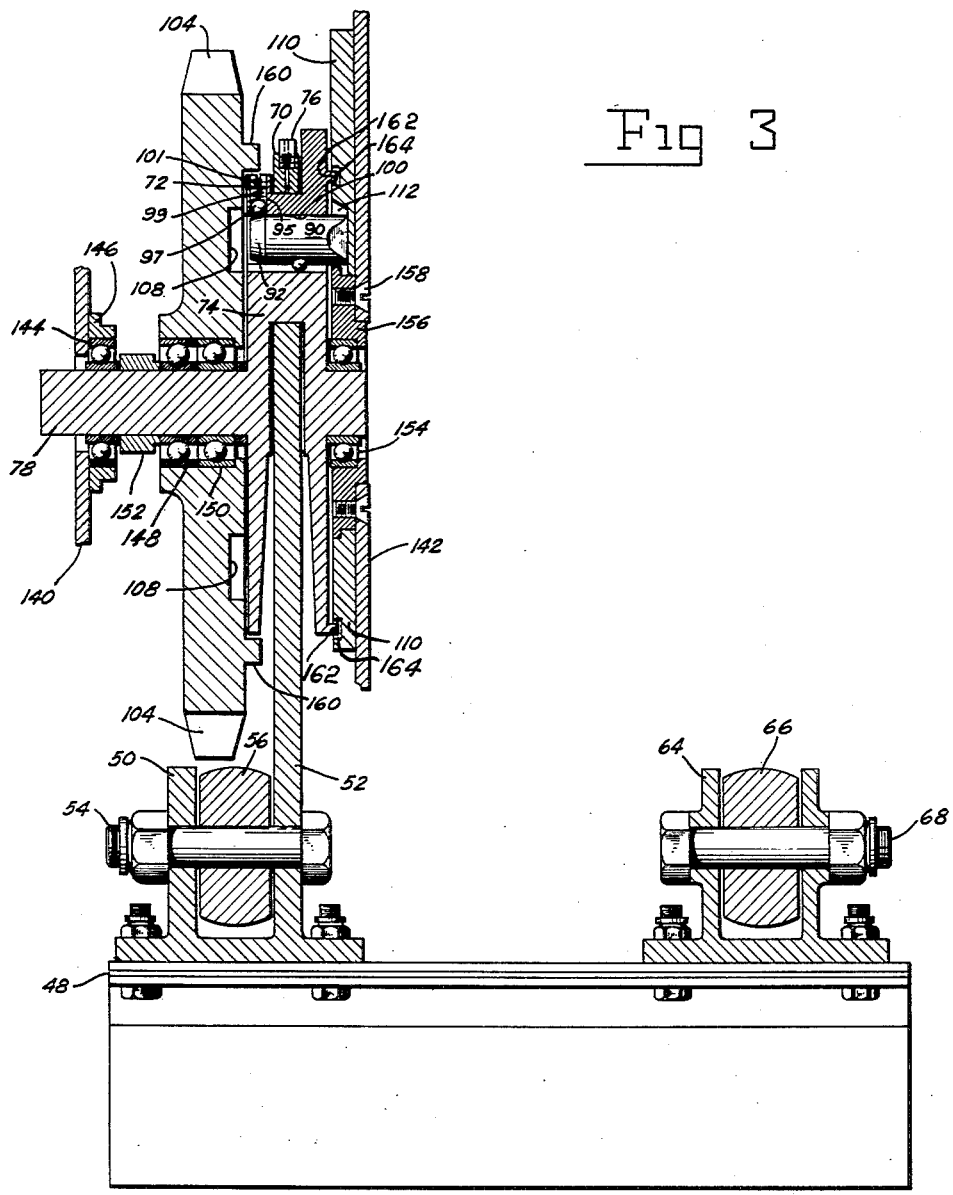

June 28, 1960 F. J. DITTER ET AL 2,942,674
CUT-OFF ATTACHMENT FOR SOD CUTTING MACHINES
Filed May 8, 1957 5 Sheets-Sheet 4

INVENTOR.
FRANCIS J. DITTER
WILLIAM C. KAERCHER JR.
BY
Stuart R. Peterson
ATTORNEY

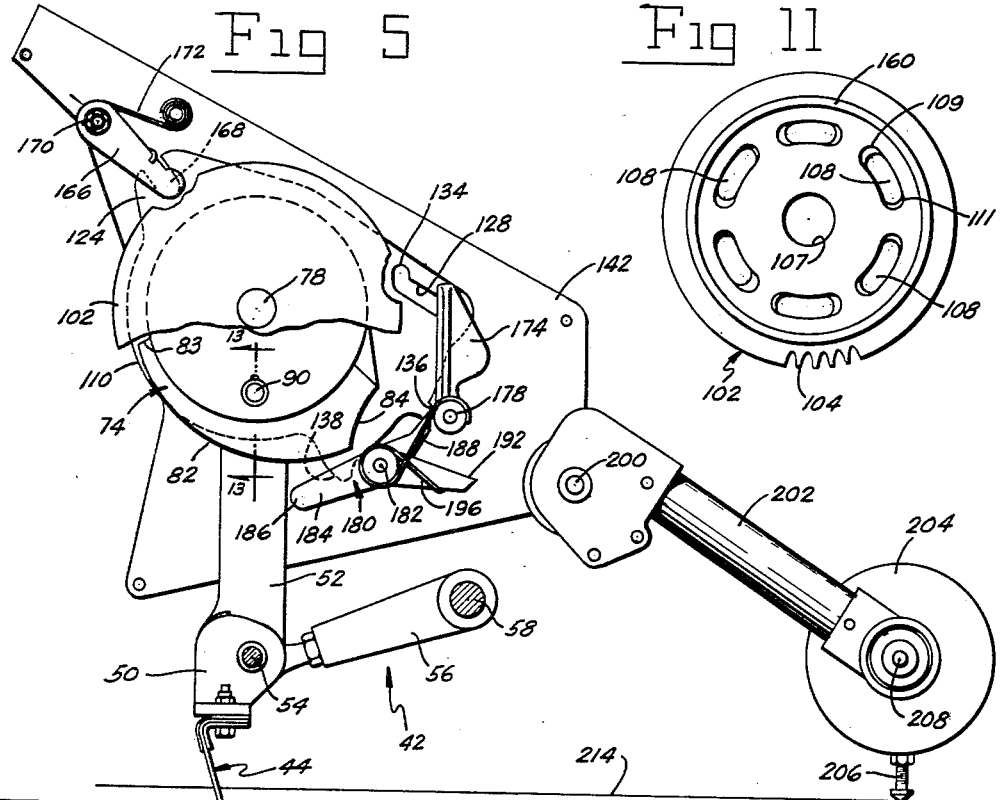
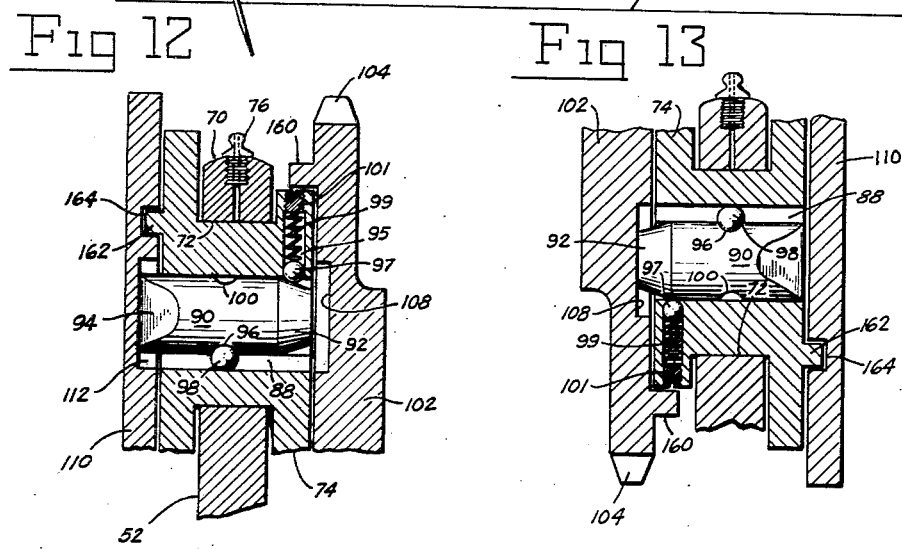

United States Patent Office 2,942,674
Patented June 28, 1960

2,942,674
CUT-OFF ATTACHMENT FOR SOD CUTTING MACHINES

Francis J. Ditter and William C. Kaercher, Jr., Minneapolis, Minn., assignors to Federal Industries, Inc., a corporation of Minnesota Filed May 8, 1957, Ser. No. 657,831

8 Claims. (Cl. 172—20)

This invention relates generally to sod cutting machines and pertains more particularly to an attachment therefor for cutting the longitudinally loosened sod into individual strips having a preferred length.

Sod cutting machines are of course not new, and those machines that have been placed on the market have met with varying degrees of success. Most of the machines of this character, however, make no attempt to incorporate therein any mechanism capable of severing the loosened sod in a lateral or transverse direction at specified intervals as the machine progresses over the field. In other words, a single pass of the sod cutting machine usually forms merely what might be termed a ribbon of sod, being detached or cut only longitudinally along its sides and bottom.

In the above type of instance nursery personnel are generally left with several choices: First, they may elect to cut the sod manually; secondly, they may attach a coulter wheel to existing equipment, such as the sod machine they have used in making the longitudinal passes; or thirdly, they may resort to a separate piece of power equipment that is provided with a cutting implement. It is believed quite evident that all of the foregoing approaches to the problem require various degrees of extra time, thereby making the overall sod cutting task more expensive.

At least one known attempt has been made to mechanize this task. This attempt involves the release of a spring propelled knife that is plunged into the ground while the sod cutter is moving across the turf. Since the path taken by the downwardly thrust knife is vertical and the advancement of the sod cutting machine is horizontal, interference is experienced between the transverse knife and the sod just ahead during the period that the knife is performing its cutting or severing action. Thus, before complete retraction of the knife can be accomplished the sod in front of the embedded knife is bunched up or rolled over upon itself. This, of course, interferes with the continued advancement of the machine and damage to the sod if the machine is not stopped quickly.

Hence, it will be recognized that the prior art leaves much to be desired in the way of a satisfactory cut-off attachment or device for sod cutting machines. Accordingly, one object of the present invention is to provide a transverse knife that will be constrained to traverse a curvilinear path having a changing direction in correspondence with the forward travel of the sod cutting machine itself such that no significant interference results with the consequent avoidance of the objected to kicking over of the sod, as mentioned above.

Another object of the invention is to provide a knife arrangement of the foregoing character that will be actuated at preferred intervals of sod cutter travel so that prescribed lengths of sod will be obtained. Also, the invention has for an aim the provision of means for adjusting the above intervals so that different length sections of sod may be produced. Further, the invention contemplates the manual triggering or release of the transverse knife so that the sod strips may be varied in length at the will of the operator without stopping the machine to make any adjustment.

Another object of the invention is to assure a more break-free knife operation. Stated more specifically, it is planned that the knife enter the turf at an angle, such an angle affording an opportunity for stones and other objects to be deflected away from the knife in contradistinction to the above-alluded to prior art device where the knife movement is in a purely vertical direction. In general, a cut-off attachment constructed in accordance with the present invention will be found to be rugged and relatively trouble-free in character.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

Figure 1 is a perspective view depicting a sod cutting machine equipped with a cut-off attachment constructed in accordance with the invention, the transverse cut-off knife being shown in a fully raised or retracted position;

Figure 2 is a fragmentary side elevational view of the sod cutting machine pictured in Figure 1 with portions of the cut-off attachment broken away in order to bring out more clearly its construction;

Figure 3 is a view taken in the direction of line 3—3 of Figure 2 in order to illustrate the general construction of the cut-off attachment and its mounting in relation to certain fixed members of the sod cutting machine;

Figure 5 is a side elevational view corresponding to Figure 2 but showing the cut-off knife in one stage of performing a cutting operation;

Figure 7 is a perspective detail view taken in the general direction of line 7—7 of Figure 2 illustrating a portion of the trip lever and the manner in which it engages a lug carried by the cam plate when said parts are in the latched position of Figure 2.

Figure 8 is a face view of the cam plate which would be seen when looking at Figure 1 or 2, the plate having also been oriented to correspond to the position it assumes in these two figures;

Figure 9 is a face view of the crank disc as it appears when looking in the same direction as in Figure 8;

Figure 10 is a sectional view of the crank disc taken in the direction of line 10—10 of Figure 9;

Figure 11 is a face view of the flywheel, the direction of viewing, however, being opposite to that of the members depicted in Figures 8 and 9;

Figure 12 is a sectional view taken in the direction of line 12—12 of Figure 2 illustrating the shuttle pin before engagement with the flywheel, and Figure 13 is a sectional view taken in the direction of line 13—13 of Figure 5 illustrating the shuttle pin during engagement with the flywheel.

Figure 4:
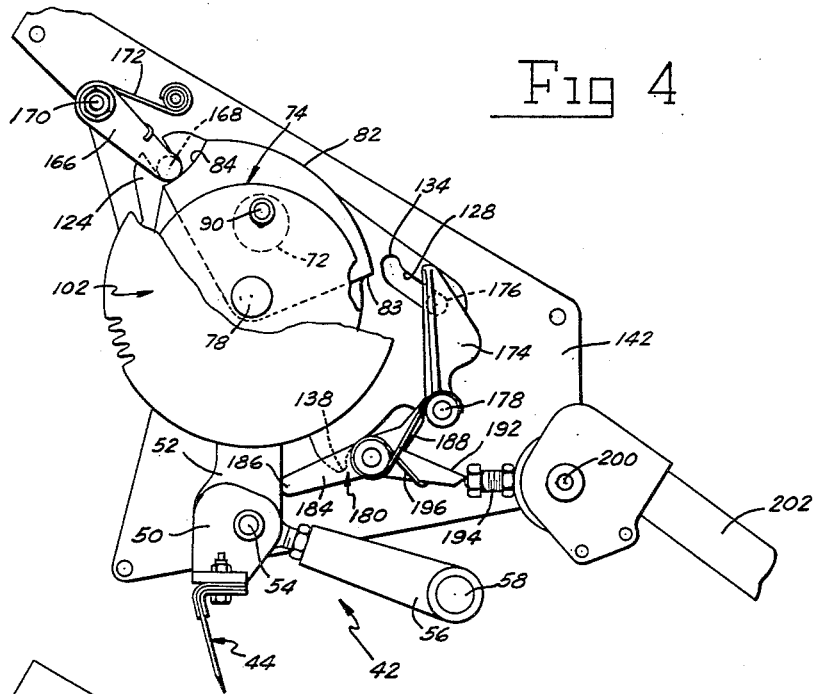
Figure 4 is an even more fragmentized view than is Figure 2, this view illustrating the parts in a relation assumed just after the trip lever has been actuated, whereas Figure 2 includes the same parts immediately prior to tripping.

Referring now in detail to Figure 1 where a sod cutting machine designated by the numeral 20 is shown in its entirety, it will be observed that the machine there set forth is equipped with a traction roller 22 driven in a suitable manner by an engine 24. In the pictured embodiment it is contemplated that a hand lever 26 and an attached rod 28 be utilized to engage or disengage a clutch on the far side of the machine in order to establish either a driving or idling relationship with the engine 24. A pair of wheels 30 serve to support the rear end of the machine while it is being advanced across the turf.

The machine 20 also includes a U-shaped sod cutting blade 32 having a horizontal edge 34 and a pair of forwardly inclined edges 36 disposed in parallel vertical planes, only one of which edges 36 is visible. Oscillatory movement is imparted to the cutting blade 32 by a suitable eccentric connection with the engine 24. The depth of cut of the blade 32 is governed through the medium of a handle 38, a locking lever 40 when tightened then assuring retention of this adjusted depth.

Inasmuch as the foregoing construction forms no part of the present invention now about to be described, no attempt has been made to give a full operating disclosure thereof. Actually, the brief explanation presented above is believed adequate for an understanding of the instant invention; however, should further details be desired reference may be had to the patent application of Francis J. Ditter, Serial No. 503,496, filed April 25, 1955, for Sod Cutting Machine in which a more detailed discussion is set forth.

Proceeding now with a description of the present invention, the cut-off attachment forming the subject matter of this invention has been generally indicated by the numeral 42 and comprises a transverse blade 44 having a downwardly directed cutting edge 46 and a mounting flange 48. On the side of the sod cutting machine 20 that is visible in Figures 1, 2, 4, 5 and 6 of the drawings, the mounting flange 48 is shown bolted to the lower or bracket end 50 of a connecting rod 52 (see left side of Figure 3). The bracket 50 carries a pin 54 passing freely through one end of a torque arm 56, the other end of the torque arm 56 being fixedly connected to a transverse rod 58. The rod 58 is pivotally mounted at its center to a lower portion of the frame structure designated generally by the numeral 60 comprising the sod cutting machine 20, the opposite ends of said rod serving as bearings for a pair of wheel brackets 62. These wheel brackets carry the previously mentioned rear wheels 30. On the side of the machine 20 that is away from the reader in the drawings there is a bracket 64 (see right side of Figure 3) corresponding in shape to the lower or bracket end 50 of the connecting rod 52. However, inasmuch as only one connecting rod 52 is employed, as will presently become manifest, the bracket 64 serves only as a connecting medium for a second torque arm 66, one end of which is visible in Figure 3. Like the first torque arm 56, this last-mentioned arm 66 is also fixedly connected to the transverse rod 58 and pivotally connected to the transverse blade 44, there being a pin 68 performing this last function. Consequently, it will be appreciated that the rod 58 supports two identical, parallel torque arms 56 and 66 which in turn are connected to opposite ends of the transverse blade 44 through the intermediary of the brackets 50 and 64. The specific role played by the pair of torque arms will soon become evident. However, it is readily apparent that the rod 58 constitutes a fixed axis about which the torque arms oscillate or pivot and that torque from the arm 56 is transmitted to the arm 66 via this rod.

The upper end of the connecting rod 52 has been assigned the reference numeral 70 and as can be seen from Figures 3, 12 and 13 this end 70 encircles an eccentric or crankshaft 72 of a crank disc 74. Lubrication of the shaft 72 is through a fitting 76. The particular make-up of the crank 74 is better understood from an inspection of Figures 9 and 10. From these two figures it will be discerned that the crank 74 has two stub shaft portions 78 and 80 projecting in opposite directions. Further, the crank has a reset cam edge 82 of rather gradually increasing radius, this edge 82 terminating in a notch 83 at one end and merging into a rather abrupt drop-off of reverse curvature at its other end 84. More will be said presently concerning this edge 82 and its specific function. At this time, though, it is to be observed that the crank 74 is further provided with an aperture 86 extending completely through the eccentric shaft 74, the bottom side of this aperture being formed with a groove or keyway 88.

Disposed for reciprocal travel back and forth within the aperture 86 is a shuttle pin 90. One end 92 of the shuttle pin is frusto-conical and the other end thereof is formed with a cam surface 94. Actually, the cam surface 94 may be one of two similar surfaces, in practice there being a second such surface on the opposite diametrical side of the pin 90. To keep the cam surface 94 properly oriented within the aperture, i.e. to keep the shuttle pin from rotating about its own longitudinal axis, the lower side of the pin is provided with a semi-spherical cavity or recess at 96 into which is partially received a ball member 98. The groove or keyway 88 accommodates the projecting half of the ball member, thereby constraining the pin for only axial movement. By locating another recess 100 diametrically opposite the first recess 96 it will be appreciated that the other cam surface 96 that is not visible may be utilized after the first surface has become worn, thus prolonging the useful life of the shuttle pin 90. To make certain that the shuttle pin 90 does not inadvertently vibrate into the path of the flywheel 102, the crankshaft 72 is drilled at 95. Into this drilled aperture 95, which communicates with the aperture 86, is placed a ball catch 97, and ugging this ball into engagement with the frusto-conical end 92 of the shuttle pin is a small coil spring 99. A threaded plug 101 holds the spring 99 captive. Owing to this ball catch engagement, only action by the cam plate 110 can shift the pin 90.

As can be readily seen from Figures 3, 12 and 13, the crank disc 74 lies intermediate two flanking members. One member is a flywheel 102 equipped with a set of sprocket teeth 104 about which is entrained a drive chain 106 (portions being shown in Figures 1 and 2) driven by the engine 24 via an intermediate shaft (not shown). As clearly illustrated in Figure 11, the flywheel 102 has a central aperture 107 and from Figure 3 it can be seen that said aperture permits the flywheel to be mounted on the stub shaft 78 of the crank 74 for relative rotation with respect thereto. Also from Figure 11 it can be observed that the flywheel 102 is provided with a plurality of angularly spaced recesses or pockets 108, each having a sloping cam surface 109 at one end thereof and a rather abrupt drop 111 at the opposite end. More will be said later on concerning the office of these pockets 108.

Mounted for relative rotation on the side of the crank 74 opposite the flywheel 102 is a cam plate 110, detailed in Figure 8. The cam plate 110 is formed with a stepped central opening 112, termed so because of a circumjacent annular lip 114, which forms a bearing surface that will be commented upon later on. Lying adjacent one segment of the opening 112 is a radial recess 116 having sloping cam surfaces 118 and 120 extending to an annular planar surface 122. The peripheral edge of the cam plate 110 is quite irregular. One portion of the cam plate 110 is extended radially to form a bifurcated section 124 having an open ended radial slot 126. Another portion is extended at 128 to permit the milling therein of a slot 130 of obtuse configuration having closed ends 132 and 134. This same portion 128 is also contoured so as to provide a pair of angularly spaced lugs 136 and 138. The role played by these various protuberances will become manifest as the description progresses.

Having mentioned the crank disc 74, the flywheel 102 and the cam plate 110, it should now be explained that rotation of these three members is about a common axis, although rotation of all three members never occurs simultaneously. Accordingly, attention should now be directed to Figure 3. In this figure it can be seen that there is provided an outer fixed plate 140 and an inner fixed plate 142. Inasmuch as these plates 140 and 142 are pictured only fragmentarily, it is to be pointed out that the plate 140 also appears in Figure 1 and the plate 142 in Figures 2, 4, 5 and 6 thereby permitting the reader to visualize the general location of these plates. At any rate it will be understood that each plate 140 and 142 is in turn affixed to the general frame structure making up the sod cutting machine 20. From Figure 3 it can be discerned that the stub shaft 78 is journaled for rotation in a bearing 144 supported by the outer plate 140 by way of a bearing retainer 146 welded thereto. Additional bearings 148 and 150 serve to mount the flywheel 102 for relative rotation about the stub shaft 78, the bearing 148 being equipped with a suitable spacing collar 152. The other stub shaft 80 is rotatably supported by a bearing 154 mounted in a bearing retainer 156 affixed to the inner plate 142 by screws 158. Thus, it will be recognized that the members 74, 102 and 110 are constrained for relative rotation in a side by side fashion. Owing to the presence of the shuttle pin 90 the crank 74 may be selectively coupled to either the flywheel 102 or the cam plate 110, but never to both at the same time. However, a specific description of this coupling or clutching feature is best reserved for discussion during the ensuing operational sequence. To avoid any misinterpretation of the drawings it should be explained that an annular tongue 160 is formed integrally on the flywheel 102 which overhangs the crank disc 74, and a similar tongue 162 on the crank disc 74 projects into a complemental groove 164 in the cam plate 110. The two tongues 160 and 162 thus serve as dust shields, preventing foreign matter from entering into the innerjacent vulnerable regions.

At this time, however, it is to be pointed out that a cam plate actuator in the form of an arm 166 having an offset end 168 is pivotally attached to the inner plate 142 by means of a pin 170. The cam plate actuator 166 is constantly urged or biased in a clockwise direction by a spring 172, thereby forcing the cam plate 110 in a counter-clockwise direction (compare Figures 2 and 4) when it is released due to the engagement of the offset end 168 in the slot 126. The cam plate 110 is released, however, only when a transverse cut is to be made in the sod. In order to limit the extent of counter-clockwise movement of the cam plate 110 under the influence of the spring 172, there is a stop arm 174 carrying an offset pin 176 (Figure 2) projecting into the cam plate's slot 128 and engageable with its end 132. Rendering the stop arm 174 pivotal is a pin 178 carried by the inner plate 142. The stop arm 174 may also be pivoted into obstructive engagement with the notch 83 on the crank 74.

Describing now the mechanism by which the cam plate 110 is held immobile until its release, a trip lever 180 is employed. This trip lever is pivotally mounted to the inner plate 142 through the agency of a pin 182. The trip lever 180 may best be described as being Y-shaped, having a leg 184 with an offset end 186 engageable by the plug 138, a leg 188 having an offset end 190 (best seen in Figure 7) engageable with the lug 136 and a leg 192 engageable by a trip pin 194. The trip lever 180, as viewed in Figure 2, is biased in a counter-clockwise direction by a spring 196, i.e. in a direction to aid in the latching of the offset end 190 on the leg 188 with the lug 136. However, a more positive latching is initially derived by the lug 138 striking the offset end 186, all in a manner hereinafter made more apparent.

The tripping pin 194, one of a number of such pins if comparatively short strips of sod are to be cut, is threadedly attached to a hub 198 mounted for rotation on a transverse shaft 200 disposed laterally through the upper end of an L-shaped casing 202. A trailing or measuring wheel 204 having a plurality of radially adjustable spokes 206 distributed uniformly about its periphery is mounted for rotation on a lateral shaft 208. The drawings have been simplified by not picturing the gearing and shafting interposed between the shafts 200 and 208. In this regard, though, it may be verbally explained that the shaft 208 has keyed thereto within the casing 202 a first bevel gear which is in mesh with a second bevel gear affixed to the lower end of an inclined shaft disposed within the longer leg of said L-shaped casing 202. At the upper end of said inclined shaft is a worm meshed with a worm gear keyed to said lateral shaft 200. In this way, it is believed obvious that the wheel 204 produces rotation of the hub 198 through the intermediary of said bevel and worm gears.

To effect a manual tripping of the trip lever 180 an actuating rod 210 is mounted on the machine 20 so that its lower end is located just above the leg 192 of said trip lever. Normally the trip rod 210 is biased upwardly by a coil spring 212, the action of which may be readily overcome by depressing the rod 210. Abutment of the rod 210 with the leg 192 of course has the same result as when the rod is struck by the tripping pin 194.

Having in mind the construction and arrangement of the principal elements thereof, it is believed that a complete understanding of the invention may now be had from a description of the operation. For a given length of cut the operator will select the number of tripping pins 194 to be utilized. In the exemplified operation it will be assumed that one such pin 194 will be sufficient. Only one pin 194 will produce relatively long strips of sod. By adjusting the radial length of the spokes 206 it will be observed that a finer adjustment may be had, the number of pins 194 giving only a coarse adjustment.

With the engine 24 in operation and the sod cutting machine 20 advancing across a field of turf the blade 32 will be constantly cutting a swath or ribbon of sod. All the while this is taking place the wheel 204 will be measuring off the length of sod strip to be cut by driving the hub 198. At the moment that sufficient advancement of the machine 20 has been made to give the desired strip length the tripping pin 194 will strike the leg 192 of the tripping lever 180. In Figure 2 this pin 194 is just beginning to strike the leg 192 but as yet no release of the cam plate 110 has resulted.

In Figure 4, however, the tripping pin 194 has moved slightly beyond the position depicted in Figure 2 and has caused the offset end 190 of the tripping lever 180 to be pivoted out of its latched position with the lug 136. Owing to the bias imparted to the cam plate 110, the spring 172 is instrumental in rapidly rotating said cam plate in a counterclockwise direction as viewed in Figures 2 and 4, there being no interference between the actuating arm 166 and the crank disc 74 because of the presence of the curved edge 84. Such counter-clockwise movement is arrested when the pin 176 on the stop arm 174 strikes the end 132 of the slot 128.

Before release of the cam plate 110 the shuttle pin 90 (see Figure 12) is in an axial position such that the end thereof having the cam surface 94 thereon is located in the recess 116. Movement of the cam plate 110, as above-described, results in the sloping cam surface 118 bearing against the cam surface 94 to force this particular end of the shuttle pin 90 completely out of the recess 116. Such action results in the frusto-conical end 92 of the shuttle pin 90 seeking the first recess 108 on the flywheel 102 that happens to pass by, it being remembered that the flywheel is being constantly rotated by the engine 24 via the sprocket chain 106. If there is no pocket 108 in registration with the shuttle pin 90 at the precise moment of release, the end 92 will only strike a portion of the flywheel intermediate two adjacent recesses 108. Such a happening will only delay the spring-loaded counter-clockwise rotation of the cam plate 110 a fraction of a second, for as soon as a pocket 108 has been rotated into alignment with the shuttle pin 90 the shuttle pin is free to move into said pocket.

With the frusto-conical end 92 projecting into one of the pockets 108 (see Figure 13) the sloping cam surface 109 comes into contact with said end 92. Thus the shuttle pin 90 has become drivingly engaged or coupled with both the crank disc 74 (it can never because of its length leave the aperture 86) and the flywheel 102. The shuttle pin 90 cannot retrace its travel at this time because the recess 116 on the cam plate 110 has now moved to an unregistered location, thereby leaving only its planar surface 122 confronting said shuttle pin. Therefore, it is believed obvious that the crank disc 74 will be driven by the flywheel 102 owing to this clutched or engaged condition.

Consequently, the crank shaft 72 forces the connecting rod 52 downwardly from the raised position in which it is depicted in Figures 2 and 4 to the lowered position in which it appears in Figure 5. For the purpose of comparing this extent of travel a ground line 214 has been drawn in Figures 2 and 5.

At this point it should be emphasized that the downward movement of the blade 44 is not rectilinear but curvilinear due to the guiding action afforded by the torque arms 56 and 66. This is by reason of the fact that the torque arms 56, 66 are connected at their rear ends to a fixedly disposed pivotal axis provided by the oscillatable cross rod 58, as well as being pivotally connected at their forward ends to the blade 44. Since the sod cutting machine 20 is traveling forwardly all the while the lowering of the blade 44 is taking place, it will be appreciated that the path followed by the blade 44 with respect to the ground or turf 214 is of somewhat involute appearance. In other words, it is the resultant of a forward rectilinear component and a circular component. Hence, the downward movement of the blade from its position in Figure 4 to that of Figure 5 is non-linear in character. Ratios and dimensions, however, are selected so that the blade 44 will for all intends and purposes be perpendicular to the ground line 214 as it engages same.

By the same token it will be understood that the withdrawal of the blade 44 from the ground 214 is curvilinear, rather than rectilinear. Thus the blade 44 approaches the turf at an angle, enters at right angles thereto, is literally rocked relative to a vertical plane while in the turf, and is retracted at a still different angle, thereby making a clean and clear cut without causing objectionable kicking over of the sod ahead of the blade 44 during its retraction or withdrawal.

Figure 6:
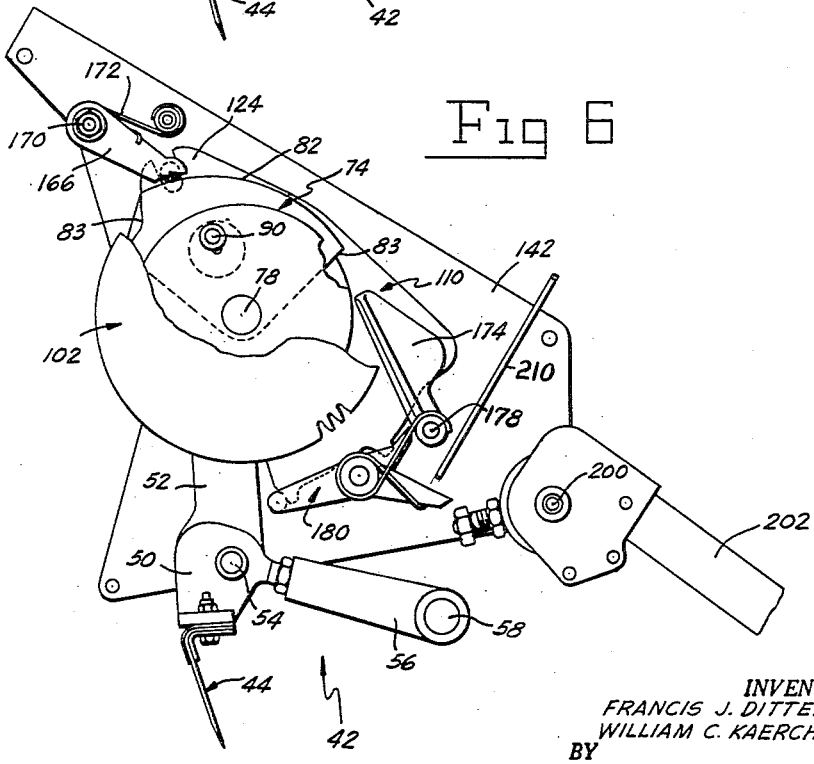
Figure 6 is a fragmentary side elevation illustrating the recocking or resetting of the attachment and the concomitant raising of the transverse knife.

Focusing attention now on the sequence of events that take place during the raising of the blade 44, it may be explained that the reset cam edge 82 is so oriented on the crank disc 74 that during this raising of the blade 44 the end of the cam edge nearest the notch 83 will engage the end 168 of the actuating arm 166 (the edge 82 is moving in a clockwise direction at this time as viewed in Figure 6). Movement of the cam edge 82 to the intermediate position shown in Figure 6 is responsible for pivoting the actuating arm 166 about its pin 170. Because the end 168 rides in the slot 126 of the bifurcation 124, the cam plate 110 is forced to move clockwise as viewed in Figure 6. Briefly, what is now happening is that the edge 82 is resetting the cam plate 110 for a subsequent strip cutting act by the cut-off blade 44. However, the cam plate 110, as pictured in Figure 6, has not as yet been completely returned to its reset position, a complete resetting not taking place until the cam plate 110 assumes the position depicted in Figure 2.

Continued movement of the cam edge 82 from the intermediate position illustrated in Figure 6 to the completely reset position of Figure 2 results in the end of the cam edge 82 at the notch 83 striking the stop arm 174, for the continued crank disc movement (the cam edge 82 being integral with the cam disc 74) will cause the stop arm 174 to be moved into obstructive relation with the notch 83 by virtue of the constrained engagement of its pin 176 in the slot 128 of the cam plate 110. Stated somewhat differently, the cam plate 110 is actuated by the arm 166 and the cam plate in turn moves the arm 174 into its blocking or stopping relation with the crank disc 74.

Because the cam plate 110 has up to this point been moved in a timed relation with the crank disc 74, it can be seen that this timed relationship can be made to take place with the recess 112 on the cam plate in registry with the shuttle pin 90. However, until the crank disc 74 is stopped by the arm 174 there is no motivating force that will shift the shuttle pin into the recess 112. Stoppage of the crank disc 74, together with continued rotation of the flywheel 102, results in the cam surface 109 of the particular recess 108 into which the shuttle pin 90 has been projecting supplying the return force necessary to move the shuttle pin in a reverse direction to once again produce engagement of the end having the cam surface 94 thereon with the recess 112.

It can be readily seen from the drawings that the highest point on the cam edge 82 occurs where this edge 82 meets the edge 84. This highest point or promontory is of sufficient radial length so that the cam plate 110 is actually rotated in a clockwise direction somewhat beyond that shown in Figure 2. This added rotation causes the lug 138 to engage the offset end 186 on the tripping lever 180, forcing the leg 184 thereof outwardly (i.e. in a counter-clockwise direction) which in turn causes the offset end 190 to be moved inwardly into an obstructive relationship with the lug 136. This occurs just prior to the nose of the stop arm 174 engaging the notch 83 on the crank disc 74. By the time the notch 83 reaches the stop arm 174, however, the crank disc 74 will have traveled beyond the highest point on the cam edge 82 and will be in alignment with the edge 84. Owing to the reverse curvature of the edge 84 the offset end 168 on the actuating arm 166 is permitted to move clockwise about its pivot pin 170. Concomitantly with this happening is a limited amount of counter-clockwise movement of the cam plate 110. When the hitherto established clearance between the offset end 190 on the trip lever 180 and the lug 136 on the cam plate 110 is taken up, the cam plate cannot move any farther in this counter-clockwise direction. With the lug 136 engaged by the offset end 190 the latching of the cam plate 110 for its next release is completed, the spring 196 assisting in the maintenance of this latched condition.

When the leg 192 of the trip lever 180 is again engaged by the pin 194 (or another one like it if more than one pin is employed) the above cycle of events is repeated. Should a strip of sod having a length less than that determined by the earlier described adjustment of the pin (or pins) 194 and the spokes 206 be desired, then depressing of the manual trip rod 210 will actuate the trip lever 180 in a manner identical to the way in which it is triggered by the pin 194.

As many changes could be made in the above construction and many apparently widely different embodiments of the invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed:

1. In a sod cutting machine, a cut-off attachment comprising a blade having a downwardly directed cutting edge extending transversely to the direction in which the machine is intended to travel, a crank member provided with a crank shaft having an aperture extending therethrough, a shuttle pin disposed for reciprocal movement within said aperture having a length slightly greater than that of said aperture, a flywheel mounted adjacent one side of said crank member provided with a plurality of recesses registrable with said aperture, means for rotating said flywheel, a cam plate mounted adjacent the other side of said crank member provided with a recess having a sloping cam surface for engaging one end of said shuttle pin to urge said shuttle pin in a direction to project the opposite end thereof into one of said flywheel recesses and thereby cause rotation of said crank member, a connecting rod having its upper end journaled on said crank shaft and its lower end connected to said blade, and arm means pivotally connected to said blade and to a fixed axis on the machine offset from said blade.

2. The structure set forth in claim 1 including spring means for moving said cam plate relative to said crank member to cause said sloping surface to effect the projection of said shuttle pin into said one of said flywheel recesses, and latch means for normally preventing movement of said cam plate until release thereof.

3. The structure set forth in claim 2 including measuring means for triggering the release of said latch means.

4. The structure set forth in claim 3 in which said measuring means includes a rotatable hub carrying a projecting pin engageable with said latch means to effect said release and a wheel engageable with the turf for driving said hub.

5. In a sod cutting machine, a cut-off attachment comprising a blade having a downwardly directed cutting edge extending transversely to the direction in which the machine is intended to travel, a crank member provided with a crank shaft having an aperture extending therethrough, said crank member being provided with a cam edge of increasing radius, a flywheel mounted adjacent one side of said crank member provided with a plurality of recesses registrable with said aperture, a cam plate mounted adjacent the other side of said crank member provided with a recess having a sloping cam surface, a shuttle pin disposed for reciprocal movement in said crank shaft aperture, said shuttle pin being of a length sufficient to engage either said flywheel or said cam plate, means biasing said cam plate in a direction to cause said sloping cam surface thereon to force said shutle pin out of said cam plate recess into one of said flywheel recesses to effect engagement between said crank member and said flywheel, latch means for preventing movement of said cam plate and hence a shifting of said shuttle pin into one of said flywheel recesses, means for releasing said latch means, a connecting rod having its upper end journaled on said crank shaft and its lower end connected to said blade, arm means pivotally connected to said blade and pivotally connected to a fixed axis on the machine offset from said blade, and means engageable with said cam edge on said crank member for returning said cam plate to a reset position after release of said latch means.

6. The structure set forth in claim 5 in which said last mentioned means include a pivotal arm having an offset end engageable with said cam edge, said offset end also engaging a slot on said cam plate.

7. In a sod cutting machine, a cut-off attachment comprising a blade having a downwardly directed cutting edge extending transversely to the direction in which the machine is intended to travel, a crank member provided with a crank shaft having an aperture extending therethrough, said crank member being provided with a cam edge of increasing radius, a flywheel mounted adjacent one side of said crank member provided with a plurality of recesses registrable with said aperture, a cam plate mounted adjacent the other side of said crank member provided with a recess having a sloping cam surface, a shuttle pin disposed for reciprocal movement in said crank shaft aperture, said shuttle pin being of a length sufficient to engage either said flywheel or said cam plate, means biasing said cam plate in a direction to cause said sloping cam surface thereon to force said shuttle pin out of said cam plate recess into one of said flywheel recesses to effect engagement between said crank member and said flywheel, a trip lever having a Y-shaped configuration including first, second and third legs with said first and second legs having offset ends, said cam plate having a pair of angularly spaced lugs thereon with the offset end on said first leg being latchable with one of said lugs to prevent movement of said cam plate under the influence of said biasing means and with the offset end on said second leg being engageable by the other of said lugs to return said trip lever to a latched position relative said cam plate, and timing means including a ground wheel for triggering said trip lever to disengage the offset end on said first leg from said one lug to permit movement of said cam plate by said biasing means, a connecting rod having its upper end journaled on said crank shaft and its lower end connected to said blade, torque arm means pivotally connected to said blade and pivotally connected to a fixed axis on the machine offset from said blade, and means engageable with said cam edge on said crank member for returning said cam plate to a reset position after release of said one lug.

8. The structure set forth in claim 7 in which said last mentioned means includes a pivotal arm having an offset end engageable with said cam edge, said offset end also engaging a slot on said cam plate.

References Cited in the file of this patent

UNITED STATES PATENTS

| | | |
|---|---|---|
| Re. 24,432 | Day | Feb. 18, 1958 |
| 230,426 | Long | July 27, 1880 |
| 1,224,717 | Darby et al. | May 1, 1917 |
| 2,544,036 | McCann | Mar. 6, 1951 |
| 2,614,477 | Habenicht | Oct. 21, 1952 |